MILTON S. DIETZ
RICHARD H. DAVISON
INVENTORS
Brown & Mikulka
BY Thomas Cooch &
Robert F. O'Connell
ATTORNEYS

MILTON S. DIETZ
RICHARD H. DAVISON
INVENTORS

BY Brown & Mikulka
Thomas Cooch &
Robert F. O'Connell
ATTORNEYS

United States Patent Office 3,464,332
Patented Sept. 2, 1969

3,464,332
AUTOMATIC EXPOSURE CONTROL SYSTEM
Richard H. Davison, Sudbury, and Milton S. Dietz, Lexington, Mass., assignors to Polaroid Corporation, Cambridge, Mass., a corporation of Delaware
Filed May 12, 1966, Ser. No. 549,594
Int. Cl. G01j 1/52
U.S. Cl. 95—10                              12 Claims

ABSTRACT OF THE DISCLOSURE

An exposure control system for use in photographic apparatus which provides for an adjustment of exposure aperture in accordance with anticipated scene light as by a follow-focus arrangement or the like. Following automatic selection of aperture in accordance with scene light, the system controls the time interval of exposure in accordance with scene illumination and with the previously selected aperture adjustment.

This invention relates generally to exposure control systems for use in photographic apparatus, such as cameras, and more particularly to an exposure control system in which both the exposure aperture opening for admitting light from the scene being photographed into said camera for impingement on a film recording medium and the exposure time are automatically controlled to optimize the operation of the camera.

In previous exposure control systems in which some type of automatic or semiautomatic control is provided for exposure time, that is, for the time period over which the aperture opening is uncovered to provide an exposure, the operator of the camera must initially set the exposure aperture opening manually in accordance with his best estimate of the light level available from the scene to be photographed. Such a system in which the exposure time is controlled in response to an electronic timing circuit is shown in U.S. Patent No. 3,205,795, issued to Grey on Sept. 14, 1965 and in U.S. Patent No. 3,205,804, issued to Topaz on Sept. 14, 1965. In such a system under bright light conditions the operator may select such a large exposure aperture opening as to require an extremely fast shutter action which may be impossible to achieve with the particular shutter available or which may be achieved only by using an inordinately expensive shutter mechanism which would make the overall cost of the camera prohibitive. Moreover, under dim light conditions the operator may select an exposure opening which may require such a slow shutter speed that camera motion of a hand-held camera occurs and produces a blurred picture. In such a system it is clear that under many conditions the camera thus will not be used in an optimum fashion.

Other previously known exposure control systems require that an operator manually preselect a particular shutter speed (i.e. exposure time) and the desired exposure aperture opening may thereupon be determined in an automatic, or semiautomatic, fashion. For example, a mechanical stop mechanism may be provided to halt the motion of the exposure aperture opening blades at a specified position in accordance with the shutter speed that has been selected. However, in such systems, under bright light conditions the particular shutter speed which has been selected may require extremely small exposure aperture openings which may be very difficult to attain in an easily controlled fashion. Moreover, under dim light conditions, the exposure aperture opening which results from the selection of a particular shutter speed may be such as to provide a very poor depth of field, and, hence, an unclear picture. In any event, in such a system it is clear that under many conditions the camera will not be used in an optimum fashion.

This invention, however, overcomes such disadvantages and provides an automatic control system which gives improved performance over known exposure control systems over a wide range of lighting conditions. In the invention the exposure aperture opening is automatically selected in response to the anticipated light level from a scene to be photographed and the exposure time is subsequently automatically controlled in response to the light actually received from the said scene during the exposure interval. The invention has been found to be useful under conditions where ambient light alone is used, under conditions where artificial light, such as a flashbulb, is used, or under conditions where both ambient and artificial light are used together, such latter condition sometimes referred to as a "fill-in flash" situation.

In accordance with the general concept of the invention the exposure aperture control system automatically selects an exposure aperture opening in response to the anticipated light level of a scene to be photographed. This aperture selection system may be likened to a "gross" or "coarse" adjustment of the overall exposure control system. Each exposure aperture size which has been selected demands a unique exposure time to be used in conjunction therewith so that the total light energy impinging on the film medium during exposure provides the best picture for the lighting conditions available. Thus, in accordance with the invention, when the appropriate aperture opening has been automatically selected, initiation of the exposure cycle actuates the opening of the shutter blade system to uncover the exposure aperture and simultaneously actuates an electronic control system (which may include, for example, an integrating control circuit) which controls the time of closure of the shutter blade system and thus, adjusts the time period over which such exposure aperture opening is uncovered (i.e. the exposure time). Because of the unique relationship between exposure aperture and exposure time, the latter must be controlled both in accordance with the particular exposure aperture that has been selected and in response to the light level of the scene being photographed as actually measured during the exposure interval. The exposure time adjustment may be likened to a "fine" or "vernier" adjustment of the overall system. Thus, the particular exposure aperture and exposure time combination which is selected provides an optimum depth of field, an exposure time which is sufficiently short to avoid camera motion problems, and a range of exposure times (i.e. shutter speeds) over which the camera is caused to operate which falls within the reasonable mechanical capabilities of the shutter actuation system.

In the case where ambient lighting conditions alone are used, the exposure aperture control system automatically selects an exposure aperture opening in response to the anticiptaed light level of a scene to be photographed by measuring such light level just prior to exposure with a photocell and actuating an aperture selection system via an appropriate electrical control circuit (the "coarse" adjustment). In one preferred embodiment of the invention, for example, the exposure aperture opening may be chosen from a combination of discrete exposure aperture blades, each containing a different aperture size, the appropriate blade, or combination of blades, being selected in accordance with the anticipated light level and being appropriately movable in response to an electrical circuit having one or more solenoid actuation devices, as described in more detail in later paragraphs. Once an appropriate exposure aperture opening has been automatically selected, initiation of the exposure cycle actuates an electronic, exposure-time control system, which includes an integrating circuit, which controls closure of the shutter blades and, thus, appropriately adjusts the time period over which such exposure aperture opening is uncovered (the "fine" adjustment). The exposure time is controlled both in accordance with the particular exposure aperture that has been selected and in response to the light level of the scene being photographed as actually measured during the exposure interval. Control in accordance with the selected exposure aperture may be accomplished in one preferred embodiment by changing the time constant of the integrating circuit as, for example, by discretely varying the capacitance of the circuit in accordance with a discrete selection of exposure aperture size. Control in response to the light level of the scene being photographed is achieved by utilizing a photocell, (whose resistance value is a function of the light energy impinging thereon) as a part of the resistance component of the integrating circuit as described in more detail below. Thus, the overall exposure aperture-exposure time control system is set up to provide an optimization of the combined settings of exposure aperture opening and exposure time (i.e. shutter speed) under ambient lighting conditions.

In the case where artificial light alone, such as from a flashbulb, is used, the exposure aperture opening also is automatically selected in response to the anticipated light level from the scene to be photographed. In this case the anticipated light level is a function of the light source output and the distance from the light source to the subject. In most cases, the light source is mounted on the camera so that distance involved is usually determined by the distance from the camera to the subject. The program for establishing the appropriate exposure aperture opening as a function of that distance is determined in such a way as to make optimum use of the light energy available from the flashbulb system consistent with the establishment of the best depth of field. Thus, in a preferred embodiment of the invention, the exposure aperture opening may be selected automatically by providing a suitable mechanical coupling system for changing the exposure aperture size as the lens system is being moved to focus the scene to be photographed. A particular and convenient method for doing so may involve a "follow-focus" system which uses a mechanical means, such as a cam follower system, as described in more detail later, which couples the focusing mechanism to the exposure aperture opening mechanism to provide a continuous variation in exposure aperture size in accordance with focusing motion (the "coarse" adjustment). Once the exposure aperture has, thus, been automatically obtained in response to the anticipated light to be received from the flashbulb system, initiation of the exposure cycle actuates an appropriate electronic integrating circuit for controlling the exposure time, in a manner similar to that discussed above with reference to the ambient lighting situation (the "fine" adjustment). Again, as discussed above with respect to the ambient situation, the exposure time must be controlled both in accordance with the particular exposure aperture that has been selected and in response to the light level of the scene being photographed as actually measured during the exposure interval. Control in accordance with exposure aperture may be accomplished in one preferred embodiment by mechanically changing the photocell aperture size simultaneously as the exposure aperture size is changed. Such a system is described in more detail in later paragraphs. Control in response to light level may be accomplished in the same manner as described above in the case of the ambient lighting situation.

Under conditions in which both ambient lighting and a flashbulb are used, although either of the above described systems produces satisfactory results, it has been found that automatic aperture control may preferably be obtained through use of the "follow-focus" aperture control system as described above with respect to conditions under which flashbulb lighting alone is used.

In any event, in accordance with the general concept of this invention, means are provided to select whichever automatic aperture control system is desirable for the particular lighting conditions involved (i.e. ambient light, artificial light, or a combination thereof) and such automatic aperture control system is used in combination with an automatic exposure time control system to provide optimum picture taking operation. The "coarse" and "fine" adjustments are always properly coordinated to provide an optimum combination of exposure-aperture and exposure-time for the particular lighting conditions available in any picture taking situation.

The detailed operation of a preferred embodiment of the invention can be described more completely with the help of the accompanying drawings in which.

Figure 1:
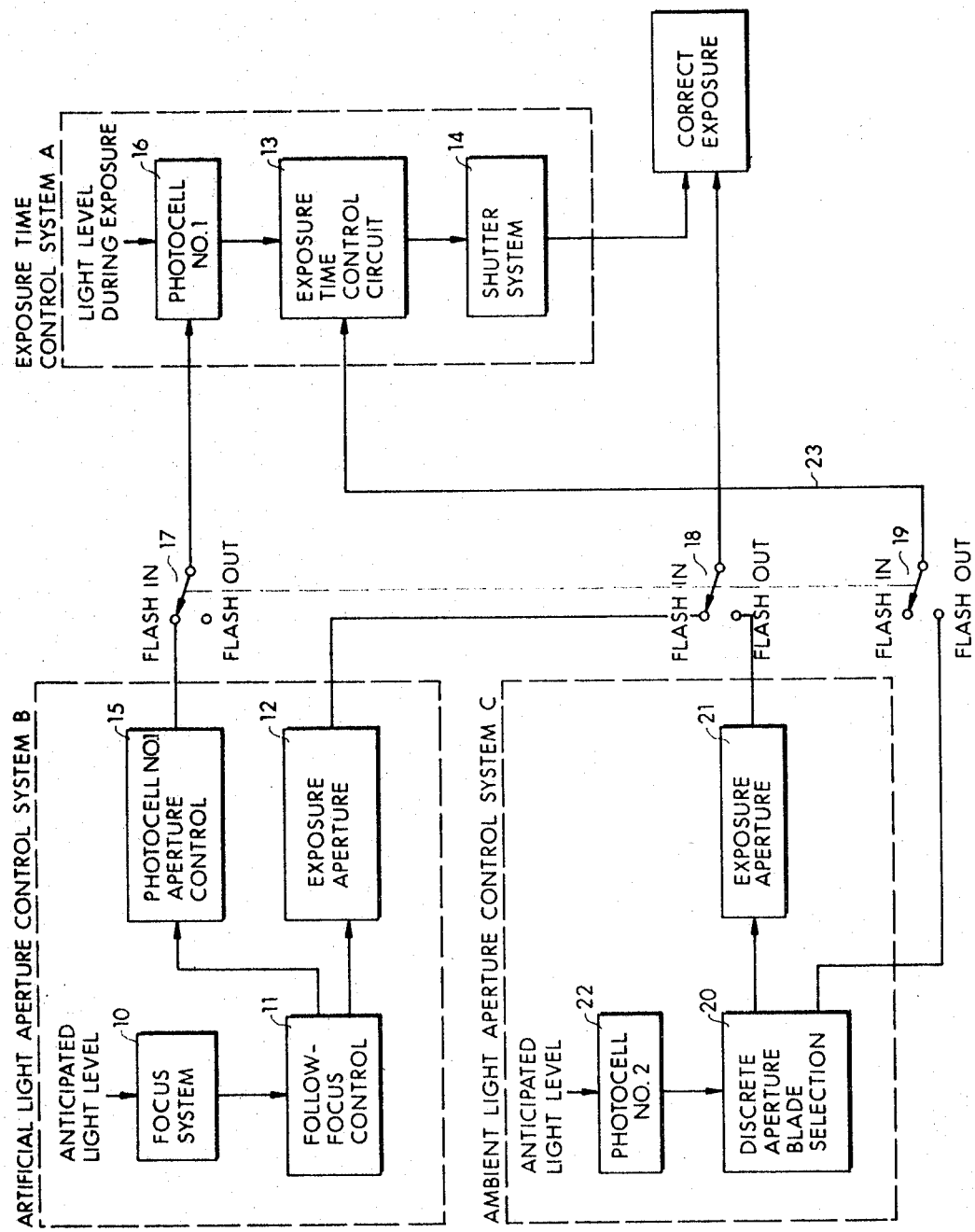
FIG. 1 shows a block diagram of the overall exposure control system of the invention.

In order to describe broadly the operation of the overall system of the invention, it is helpful to consider the block diagram shown in FIG. 1. In that figure an electronic exposure time control system A is utilized in conjunction with either artificial light aperture control system B or ambient light aperture control system C, depending on which type of lighting is being utilized for exposure. The selection of the appropriate combination of control systems can, thus, depend on whether or not a flashbulb is inserted into place, as shown schematically by the appropriately ganged switches 17, 18 and 19.

Under conditions of artificial light, wherein the light has a relatively short duration, as from a flashbulb, the anticipated light level at the camera will depend upon the flashbulb system which is used and upon the distance from the subject being photographed to the light source. In most picture taking situations where flashbulb operation is used indoors, for example, the light tends to be reflected from many surfaces and the light level may not follow the classical inverse-square law (i.e. where the light level varies inversely with the square of the distance from the light source to the point where the light is being received). While the inverse-square law is found to hold in a substantially non-reflective environment, experimentation has shown that in reflective environments the anticipated light from the scene being photographed approximates an inverse-linear relationship in such a manner that the amount of light reaching the camera varies substantially inversely with the distance from the camera to the subject being photographed.

Thus, where the flashbulb light source is mounted on the camera, it is possible in one preferred embodiment to arrange a control system, such as aperture control system B, for providing an appropriate exposure aperture opening in which the mechanism for opening and closing a continuously variable exposure aperture is coupled to the lens focusing system of the camera which moves the lens system in accordance with the distance from lens to subject. Thus, as the lens focus system 10 is moved to provide the correct focus for a particular distance from the camera to the subject, the coupling mechanism of the follow-focus control system 11 also moves to provide an appropriate exposure aperture opening 12 in response to the focusing action. Thus, the exposure aperture is set in accordance with the anticipated light level at the scene to be photographed which, because of the known characteristics of the flashbulb being used, is functionally related to the distance to the subject. Such setting, thus, can be arranged to provide the best depth of field for the particular picture taking situation. This operation then represents the "coarse" adjustment discussed above.

In addition to exposure aperture control system B, exposure time control system A is utilized to control the movement of the shutter blades of shutter system 14 so as to uncover the exposure aperture opening for an appropriate time period in accordance with the exposure aperture which has been selected and in response to the light level of the scene to be photographed as measured during the exposure interval. The exposure time control system utilizes a photocell 16 which measures the light level during exposure and, as described more completely below with respect to FIGS. 2 and 3, changes a parameter in an electronic control circuit 13 in response to said light level so as to actuate the shutter system for the appropriate time interval. As described in the specific embodiment of FIGS. 2 and 3, the electronic circuit may be preferably of the integrating type which continuously measures the total accumulated amount of light energy impinging on the photocell of the circuit via the photocell aperture. The accumulated light energy on the photocell is appropriately related in a known manner to the accumulated light energy impinging on the film medium via the exposure aperture. When the total accumulated light energy on the film medium reaches a value such as to provide a correct exposure, the total accumulated light energy on the photocell is such as to cause the electronic integrating circuit to initiate closure of the shutter.

In order to provide the correct known relationship between the light energy impinging on the photocell and that impinging on the film medium, as required above, the aperture of the photocell used in the exposure time control system is varied simultaneously as the exposure aperture opening is varied during the focusing operation, as described in greater detail below. Thus, follow-focus control system 11 must also be coupled to a photocell aperture control system 15 to control the amount of light entering photocell 16 during the exposure interval.

In the situation where a flashbulb is inserted, the follow-focus control system is made available for use with the exposure time control system. Once the exposure aperture opening 12 is set to an appropriate value by the follow-focus control system 11, as a function of the anticipated light level, photocell 16 and exposure time control circuit 13 control the exposure time interval in accordance with the exposure aperture which has been selected and in accordance with the light level as actually received from the scene during the exposure interval. The exposure-time control then represents the "fine" adjustment discussed above.

Under ambient lighting conditions, in which no artificial light is used, the follow-focus control system is disabled and ambient light aperture control system C is used to provide an appropriate exposure aperture opening 21. Thus, schematically, switches 17, 18 and 19 are in the "Flash Out" position. During such operation the anticipated light level, as measured by a photocell 22 prior to actuation of the shutter system, allows an appropriate exposure aperture opening to be selected by the operation of discrete aperture blade selection system 20, as described in more detail below with reference to FIGS. 4 and 5. This operation then represents the "coarse" adjustment discussed above.

Once the appropriate exposure aperture opening has been selected, the shutter system is controlled by the operation of exposure time control system A in accordance with the exposure aperture which has been selected and in accordance with the light level actually received during the exposure interval by the photocell 16. Control in accordance with the exposure aperture selected may be appropriately achieved by changing the time constant of the electronic time control circuit, for example, as the exposure aperture changes, as schematically represented by line 23 of FIG. 1.

Thus, whether ambient lighting conditions or artificial flashbulb lighting conditions are used, substantially the same general exposure time control system configuration is utilized with either one or the other of the exposure aperture control systems.

In order to describe in more detail the structure and operation of one preferred embodiment of the invention which is shown generally in the block diagram of FIG. 1, reference is made to FIGS. 2 through 6 of the accompanying drawing. The subsequent paragraphs describe more specifically each of the major subsystems of the overall system of the invention shown in FIG. 1. A particular exposure time control system is discussed in detail with reference to FIGS. 2 and 3, a particular exposure aperture control system for use under ambient lighting conditions is described in more detail with reference to FIGS. 4 and 5 and a follow-focus exposure aperture control system for use under flashbulb conditions is described in more detail with reference to FIG. 6.

Exposure time control system

A preferred embodiment of an exposure time control system useful in the overall control system of the invention, described below with reference to FIGS. 2 and 3, utilizes a conventionally known photographic shutter system and has a light-integrating, switching circuit adapted to control the duration of the exposure time effected by the shutter movement.

Figure 2:
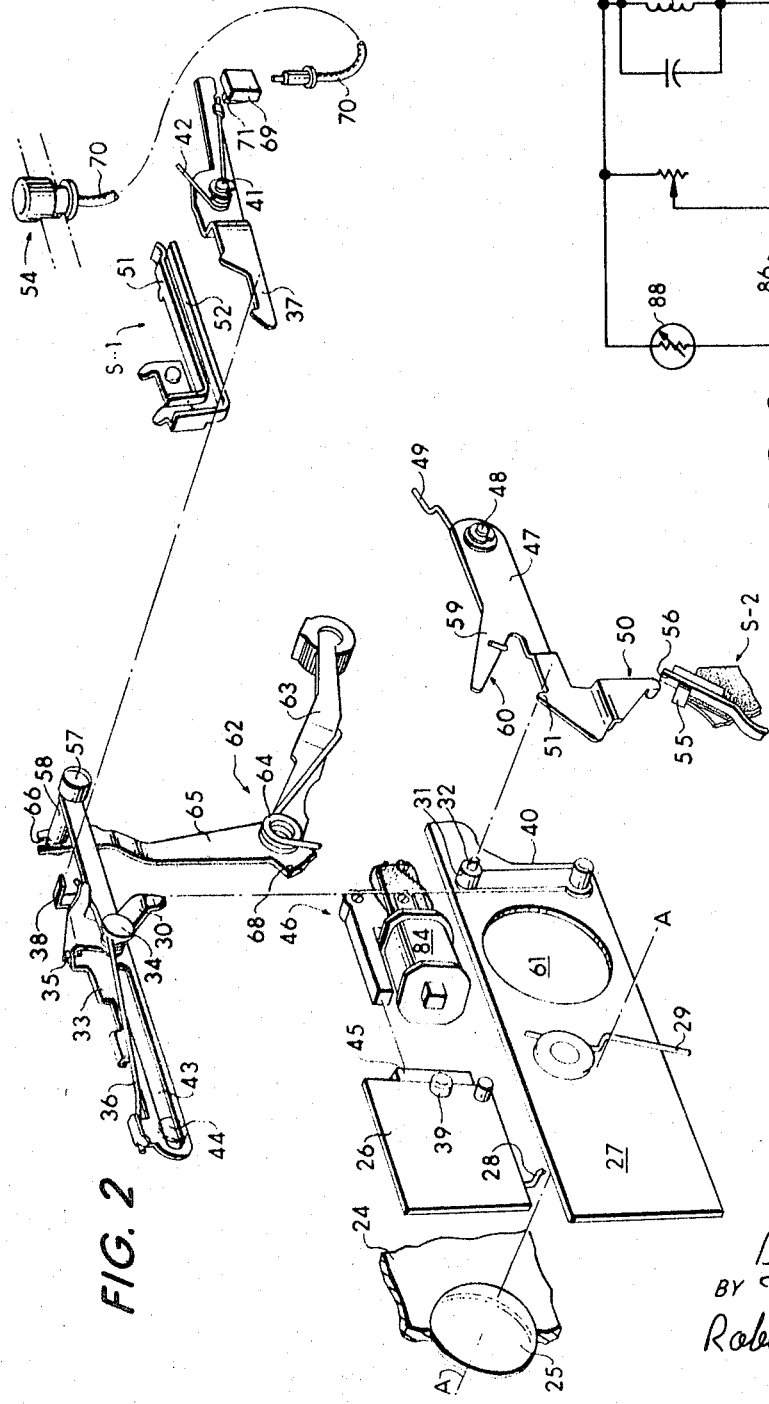
FIG. 2 shows an exploded, perspective view of one preferred embodiment of a portion of exposure time control system of the invention.

Referring now to the accompanying drawings, FIG. 2 shows a portion 24 of a shutter housing, lens board, camera body, or other such means, commonly used to define a lens opening 25 having a centrally disposed axis A—A. A pair of shutter blades 26 and 27 are slidably mounted upon suitable support means (not shown) for movement relative to the lens opening. As drawn in this figure, the shutter blades are shown in a "cocked" position preparatory to actuation of the shutter mechanism to effect exposure. Blade 27 is retained in its cocked position against the bias of spring 29 by the lower arm of a lever 30 which bears against a collar 31 of pin 32 which is fixedly mounted to the trailing portion of blade 27. Lever 30 is in turn rotatably mounted on a sliding bar 33 at pin 34 and is normally biased to rotate in a counter-clockwise direction by the action of spring 36. The counter-clockwise rotation of lever 30 is limited by a stop lug 35 on sliding bar 33.

Sliding bar 33 is retained in its cocked position, to the right as shown in the figure, by a latching mechanism 37 which engages a lug 38 of sliding bar 33. The movement of sliding bar 33 to its cocked position causes lever 30 to rotate slightly in a clockwise direction against the action of spring 36 so as to bear firmly against collar 31 and thus ensures that blade 27 is held securely in its cocked position. Blade 26 is retained in its cocked position against the bias of spring 28 by means of pin 39 mounted thereon, which pin bears against the trailing edge 40 of blade 27 so that blade 26 is thereby also held securely in its cocked position.

Latching mechanism 37 is pivotally mounted to the shutter housing at pin 41 and is biased to rotate in a clockwise direction toward its latching position by means of spring 42, one end of which bears against a portion (not shown) of the shutter housing.

Sliding bar 33 has a slot 43 which is movable with respect to a pin 44 which is fixedly mounted to the shutter housing and inserted into slot 43. Shutter blade 26 has a keeper element 45 fixedly attached to its trailing edge, which element is positioned adjacent the magnet of an electromagnet 46 when shutter blade 26 is in its initial, cocked position. Electro magnet 46 is energized and de-energized in accordance with an electronic timing circuit discussed in more detail below with respect to FIG. 3 in order to restrain and permit movement of blade 26.

A second latching mechanism 47 is pivotally mounted to the shutter housing at pin 48 and is normally biased to rotate in a clockwise direction by the action of spring 49. Latching mechanism 47 has a lower arm 50 having a latching lug 51, the function of which will be described in more detail below.

A first switch S–1, having a pair of contacts 51 and 52 which are normally open as shown, is positioned adjacent latching mechanism 37. A second switch S–2 having a fixed contact element 55 and a movable contact element 56 is mounted in a position below latching mechanism 47. Contact element 56 is spring loaded so that S–2 is normally closed as shown.

A shutter actuation button 54 is mounted in an external position on the camera housing so as to be available to the camera operator for actuation of the shutter sequence of operations to effect an exposure. Button 54 is mechanically coupled to a vertically movable plate 69 by a flexible cable 70 so that when the shutter button is depressed, plate 69 moves in an upward direction. Movement of plate 69 thereby causes projection 71 thereon to bear against the lower element 52 of switch S–1 to cause it to come into contact with element 51 thereof to close the switch. Projection 71 immediately thereafter bears against the right hand end of latching mechanism 37 causing it to rotate in a counter-clockwise direction in opposition to the action of spring 42 so as to release sliding bar 33 and cause it to move to the left under the action of spring 64.

FIG. 2 shows the shutter mechanism in its cocked position preparatory to actuation of the shutter blades to effect exposure by the operator. Thus, when the camera operator depresses shutter actuation button 54, switch S–1 closes, latching mechanism 37 rotates and sliding bar 33 is released to move in a linear direction from right to left. The motion of sliding bar 33 causes lever 30 to move away from collar 31 of pin 32 so that shutter blade 27 begins to move to the left under the action of spring 29.

Shutter blade 27, however, is momentarily held by the latching action of lug 51 on latching mechanism 47 which engages pin 32 on blade 27. As sliding bar 33 moves further to the left, collar 57 of pin 58, which is mounted at the right-hand end of sliding bar 33, bears against the upper cam surface 59 of upper arm 60 of latching mechanism 47. Latching mechanism 47 is thereby caused to rotate in a counter-clockwise direction in opposition to the bias of spring 49. Such rotation causes pin 32 to be released from its engagement with lug 51 and shutter blade 27 thereby slides immediately to its second position under the action of biasing spring 29. In such position, the shutter aperture opening 61 is moved into a position in line with front element lens opening 25. Blade 26, however, is retained in its initial position, as shown in the drawing, by the attractive force exerted by electromagnet 46 on keeper element 45, as discussed in more detail with reference to FIG. 3.

When blade 27 is in its second position and blade 26 is retained in its initial position, light from a scene being photographed is allowed to pass through lens opening 25 and through opening 61 in blade 27 to impinge upon a photographic film or the like (not shown) for the purpose of effecting a photographic exposure.

As latching mechanism 47 rotates in a counter-clockwise direction to release shutter blade 27, its lower arm 50 bears against the movable contact 56 of switch S–2 so that the latter switch is simultaneously opened.

When electromagnet 46 is de-energized, blade 26 is released and allowed to move to its second position (not shown) wherein it is now in alignment with axis A—A and blocks the passage of light through lens opening 25 to the photographic film, thus terminating the exposure.

Following exposure, the shutter blade system may be reset to its cocked position by the operation of a cocking mechanism in the form of a crank 62 having a first arm 63 arranged to extend externally to the camera housing so that crank 62 may be manually rotated in a clockwise direction by the camera operator against the action of spring 64. Rotation of crank 62 in a clockwise direction causes a second arm 65 to effect the return movement of sliding bar 33 to the right by means of an open ended slot 66 which cooperates with pin 58 fixedly mounted to end of sliding bar 33. Crank 62 has a third arm 68 which is used to cock the ambient aperture blade selection system which is described in more detail with reference to FIG. 4. As sliding bar 33 moves from left to right, the shutter blades are again reset to and held in their initial, cocked positions by the action of lever 30 and latching mechanism 37.

Figure 3:
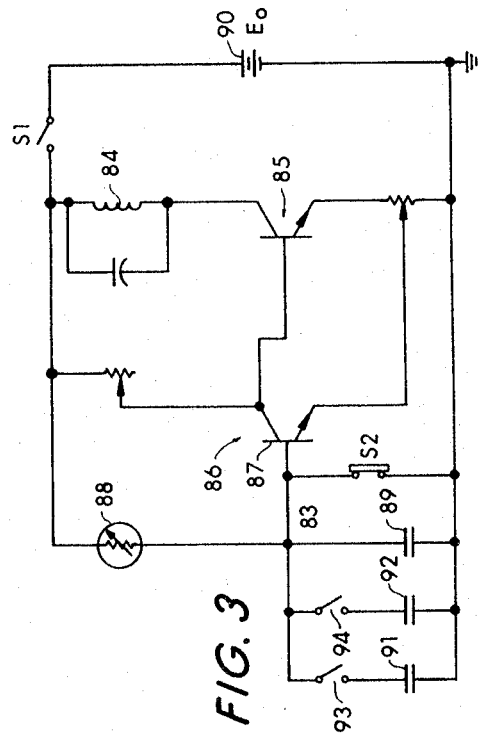
FIG. 3 shows a circuit diagram of the integrating circuit of the exposure time control system of the invention.

It should be noted that a time delay exists between the initial closure of switch S–1 and the opening of switch S–2, the function of which is explained in more detail with respect to the circuit of FIG. 3. The time interval over which the film is exposed is substantially the time between the arrival of blade 27 at its second position and the movement of blade 26 to its second position. Since the movement of blade 26 from its initial position is controlled by electromagnet 46, the timing means for controlling exposure duration may comprise suitable means for de-energizing electromagnet 46 at the proper time after the release of blade 27. Such a means is illustrated in FIG. 3 and comprises a transistorized trigger circuit for controlling the current supply through coil 84 of the electromagnet which provides for the energization of the electromagnet 46. The operation of the circuit shown in FIG. 3 is similar to the operation of the circuit shown in the above mentioned Topaz patent and is summarized briefly here below.

As described above, when shutter actuation button 54 is depressed to effect the release of shutter blade 27, switch S–1 is initially closed prior to the release of said shutter blade. Closure of switch S–1 causes transistor 85 to conduct almost instantaneously because of the particular bias voltages established at the transistor junctions as a result of this closing of the switch to energize the circuit from battery source 90 having a potential $E_0$. Conduction of transistor 85 causes a current through coil 84 of electromagnet 46 to retain shutter blade 26 in its initial position after blade 27 has moved away from its initial position. At this point in time, the other transistor 86 as shown in the circuit is non-conducting.

Simultaneously with the release of blade 27 the lower arm of latching mechanism 47 bears against movable contact element 56 of switch S–2 thereby causing switch S–2 to open. Until S–2 opens, the voltage at base 87 of transistor 86 is maintained at ground potential. The circuit combination of variable resistor 88 and capacitor 89 operates as an integrating circuit. Thus, when switch S–2 opens, the voltage at point 83 changes from its initial ground potential to a preselected value $V_1$ in a period of time depending on the value of capacitor 89 and on the value of resistance 88 as established by the intensity of the light from the scene to be photographed. The rate of increase in such voltage is thus dependent on the well-known time constant "RC" of such circuit in accordance with the following equation:

$$t = RC \ln \frac{1}{1 - \frac{V_1}{E_0}}$$

Capacitances 91 and 92 are used in the circuit of FIG. 3 only under certain conditions when such circuit is used in conjunction with the ambient exposure aperture control system as discussed more fully below with reference to FIGS. 4 and 5. Thus, so long as switches 93 and 94 remain open, only the capacitance 89 is determinable of the value of C in the "RC" time constant discussed above.

When the voltage at base 87 (point 83) reaches a particular preselected value $V_1$, transistor 86 conducts and its conduction changes the bias conditions on transistor 85 in such a manner as to cause transistor 85 to become substantially instantaneously non-conducting. In accordance with appropriate parameter values utilized in the circuit, the change from the conducting to the non-conducting state of transistor 85 sharply decreases the current through coil 84 thereby causing the electromagnet to rapidly reduce its attractive force on keeper element 45 so as to release blade 26 and cause it to move to its second position under the biasing force of spring 28.

It is clear that the time at which the release of blade 26 takes place relative to the time of release of blade 27 is dependent upon the value of resistance 88 in the integrating circuit. In such circuit resistor 88 represents the resistance value of a photo-responsive element, such as a photocell, conventionally used in light measuring devices in photographic apparatus. The photocell, which is disposed to receive light from a scene being photographed, has a resistance value which is functionally related to the level of scene brightness. Thus, a high light level under very bright conditions produces a low resistance value of resistance 88 and, hence, a small "RC" time constant for the circuit which results in a short exposure time. Similarly, a low level of scene brightness produces a high resistance value and, hence, a longer time constant for the circuit which results in a long exposure time under dim light conditions.

As discussed above, the exposure time control system of FIGS. 2 and 3 may be used in conjunction with either an exposure aperture control system designed for ambient lighting conditions or with one designed for flashbulb lighting conditions. a particular exposure aperture control system for use under ambient lighting conditions will be described first in the following paragraphs, it being clear that the follow-focus system for use under flashbulb conditions must be disabled in such a case, in a manner described in more detail later. An ambient exposure aperture control system using a selectable combination of discrete aperture blades is shown in FIGS. 4 and 5.

Exposure aperture control system—ambient

Figure 4:
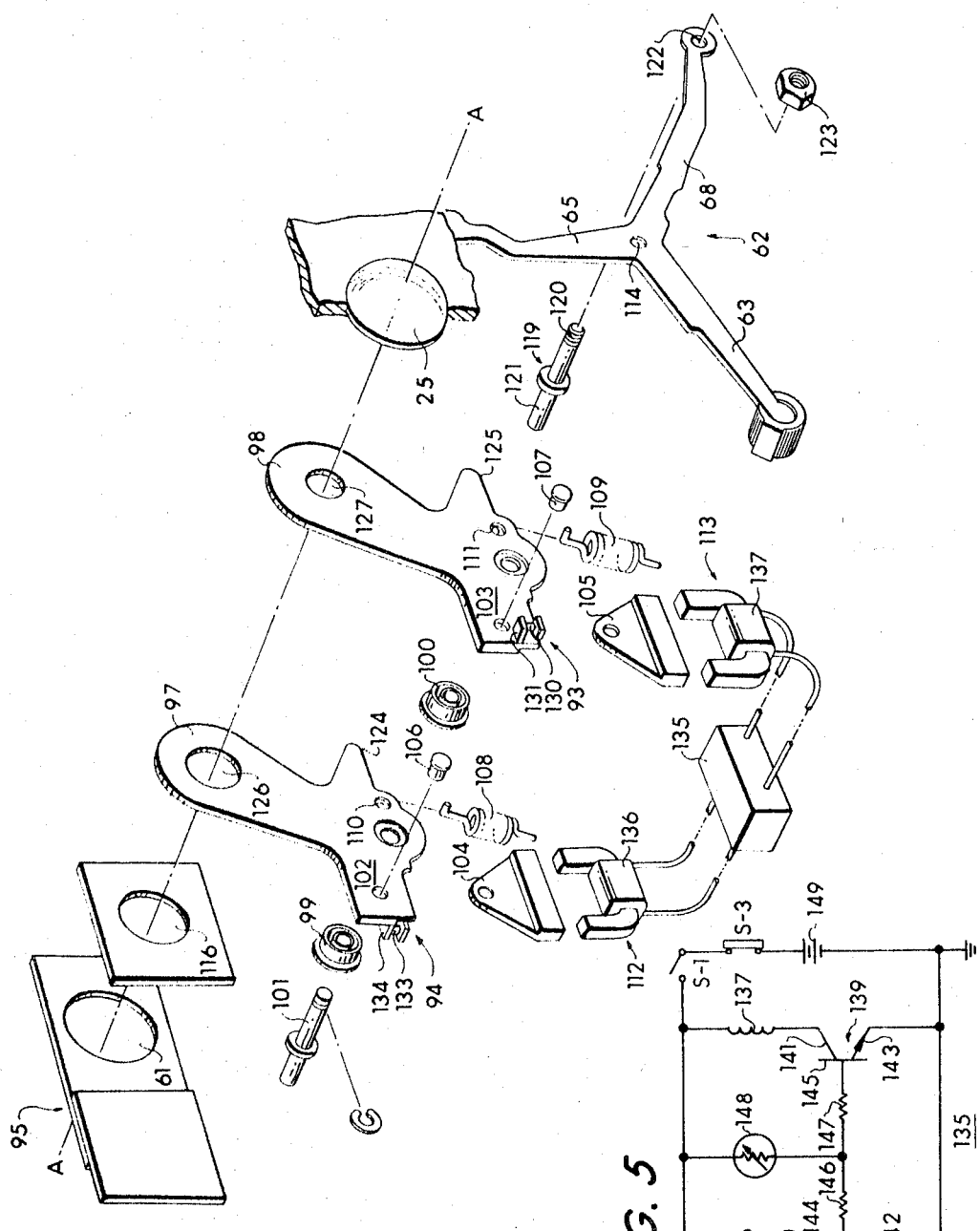
FIG. 4 shows an exploded perspective view of one preferred embodiment of the exposure aperture control system of the invention for use under ambient lighting conditions.

In FIG. 4 there is shown an exploded, perspective view of one embodiment of an exposure aperture control system for use under ambient light conditions. In this particular figure two aperture blade elements are shown in a "cocked" position preparatory to the automatic selection of a particular blade combination for providing an appropriate exposure aperture opening in accordance with the anticipated ambient light level of the scene to be photographed. A shutter system 95 in the form of a pair of juxtaposed shutter blades slidably mounted and moved in seqeunce, as discussed above with reference to FIGS. 2 and 3, is utilized in combination with a fixed aperture opening 116 adjacent thereto to effect an exposure. Between the aperture opening 116 and the front element camera lens 25 (also shown in FIG. 2) are mounted two aperture blades 97 and 98. The blades are pivotally mounted in bearings 99 and 100, respectively, on a shaft 101 suitably fixed to the camera housing (not shown). Aperture blades 97 and 98 have arms 102 and 103, respectively, at the ends of which magnetic keeper elements 104 and 105 are attached by pins 106 and 107, respectively. Springs 108 and 109 are each attached at one end to openings 110 and 111 at the bottom of blades 97 and 98, respectively, and are fixedly attached at their other ends to the camera housing. Thus, each of the aperture blades is spring biased to rotate in a clockwise direction.

A pair of solenoids, 112 and 113, comprising magnets around which are wound coils 136 and 137, respectively, are used to retain keeper elements 104 and 105, respectively, when the coils of which are suitably energized via an electrical circuit shown as block 135 and described in more detail with reference to FIG. 5. Solenoids 112 and 113 are fixedly mounted to the camera housing in any suitable manner. When energized, solenoids 112 and 113 attract keeper elements 104 and 105 and retain blades 97 and 98 in their cocked positions.

A cocking mechanism in the form of a crank 62 (shown also in FIG. 2) is pivotally mounted on the camera housing and has three arms 63, 65 and 68, extending from the pivotal point 114. As discussed above, arm 62 extends through the camera housing and is made externally available to the camera operator so as to be movable manually in a downward direction to cause cocking crank 62 to rotate in a counter-clockwise direction in the view shown here. Cocking crank 62 is normally spring biased to move in a clockwise direction under the biasing action of a spring means 64 not shown in this particular figure but shown more clearly with reference to the description of the shutter system in FIGURE 2.

Arm 68 has a pin 119 mounted at its outer end by means of threaded end portion 120 which extends through opening 122 of arm 68 and is secured thereto by a nut 123. The opposite end portion 121 of pin 119 extends to a position such that it comes into contact with the lower cam surfaces 124 and 125 of aperture blades 97 and 98, respectively, so that as cocking crank 62 rotates in a counter-clockwise direction, the blades are similarly rotated in a counter-clockwise direction to their cocked positions where keeper elements 104 and 105 are maintained in a position adjacent the magnets of solenoids 112 and 113, respectively.

Each of the aperture blades has an aperture opening 126 and 127, respectively. These openings are of different sizes, the larger opening 126 being in blade 97 and the smaller opening 127 being in blade 98. Aperture opening 116 is larger than opening 126. Shutter system 95 and lens 25 also provide openings during exposure, which openings are larger yet than aperture opening 116.

In accordance with the above described aperture blade control system, an appropriate combination of said blades may be selected by the operation of electric circuit 135 to be used with fixed aperture opening 116 to provide an appropriate exposure aperture opening. Such combination will involve the selection of either blade separately, of both blades together or of neither blade. Initially, when cocking crank 62 is rotated by the camera operator to its cocked position in opposition to the cocking mechanism spring bias, aperture blades 97 and 98 are simultaneously rotated in a counter-clockwise direction to a position adjacent the magnets of solenoids 112 and 113 so that openings 126 and 127 are in the path of the light which enters shutter blade opening 61 and passes through opening 116 to front element lens 25 along axis A—A. Thus, in the initial cocked position, prior to shutter initiation, both openings 126 and 127 are available for use during exposure.

Thus, it is clear that any one of three discrete aperture openings may be selected for use during exposure depending on which combination of aperture blades is utilized in conjunction with fixed aperture opening 116, front element lens opening 25 and the opening 61 of shutter system 95. In a first case where the smallest opening is desired, both aperture blades are retained in their cocked positions after initiation of the shutter actuation system so that opening 127 controls the amount of light available for transmission from the scene to be photographed to the lens of the camera. Such operation is described more clearly with reference to the circuit of FIG. 5.

In a second case where the next larger opening is desired, only blade 98 is released from its cocked position after shutter initiation (in a manner discussed more completely below with reference to the operation of electric circuit 135) and is caused to rotate in a clockwise direction to an offset position where its opening 127 is no longer in line with lens opening 25 and shutter opening 61 along axis A—A. In such a case, aperture blade 97 is retained in its cocked position and its opening 126 controls the amount of available light.

In a third case where the largest of the three openings is desired, both shutter blades 97 and 98 are released and caused to rotate to their offset positions where openings 126 and 127 are no longer in line with lens opening 25 and shutter opening 61 and the opening 116 controls the amount of available light.

Accordingly, any one of three openings may be selected by appropriate operation of electrical circuit 135 in response to the anticipated light level. This operation is now described in more detail with reference to FIG. 5.

Figure 5:
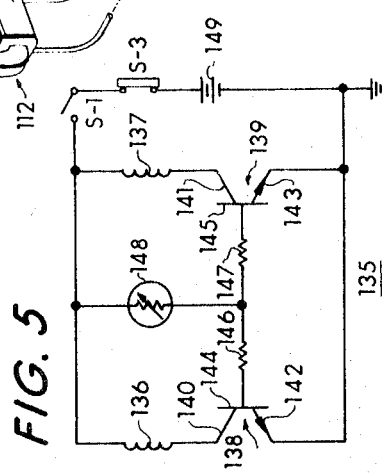
FIG. 5 shows a circuit diagram of the electrical control circuit used with the exposure aperture control system shown in FIG. 4.

FIG. 5 shows a circuit 135 which includes a pair of parallel connected transistors 138 and 139, the collectors 140 and 141 of which are connected to one side of a DC bias source 149, such as a battery, through coils 136 and 137 of solenoids 112 and 113, respectively, and through a pair of normally open contact elements of switch S–1 and normally closed contact elements of switch S–3. S–1 closes upon actuation of shutter actuation button 54 as discussed with reference to FIG. 2. S–3 remains closed until flashbulb operation is used. When a flashbulb is used S–3 opens and the control circuit of FIG. 5 is disabled as described in more detail with reference to FIG. 6.

The emitters 142 and 143 of transistors 138 and 139, respectively, are each connected to the other side of DC source 149 which is in turn connected to ground potential. Bases 144 and 145 of transistors 138 and 139, respectively, are each connected to one side of a photocell 148 via resistors 146 and 147, respectively, the other side of photocell 148 being connected to the ungrounded side of DC source 149. Photocell 148 represents a variable resistor, the resistance of which varies inversely as a function of the light level impinging thereon, in the same manner as that discussed above with reference to photocell 88 of FIG. 3.

Operation of circuit 135 in conjunction with the ambient aperture blade system shown in FIG. 4 can be described as follows. Under conditions where a range of relatively low ambient light levels is anticipated from a scene to be photographed, the resistance value of photocell 148 is in a relatively high range. Thus, in this first range of low light level values, the bias voltages imposed on the elements of transistors 138 and 139 are such that neither transistor conducts. Under such conditions, no current flows through either coils 136 or 137 of solenoids 112 and 113. Both solenoids, thus, are in unenergized states so that no attractive force is exerted on keeper elements 104 and 105 and aperture blades 97 and 98 cannot be retained in their cocked positions. Such blades, therefore, each rotate in a clockwise direction under the action of springs 108 and 109 to positions where openings 126 and 127 are no longer in line with lens opening 96. In such a state, only aperture opening 116, the largest of the three available aperture openings shown and discussed with reference to FIG. 4, controls the amount of light available from the scene to be photographed. Under a range of low light level ambient conditions, then, the largest of the three exposure aperture openings is selected.

Under conditions where medium amounts of light are available from the scene to be photographed, it is desirable to use the next smaller, or middle-sized, aperture opening, i.e. aperture opening 126 of blade 97. Within a range of such medium light level conditions, the resistance of photocell 148 assumes a range of values such that the bias voltage conditions imposed on transistor 138, a purposely selected, high-gain transistor, cause conduction thereof. On the other hand, under such conditions, transistor 139, purposely selected as a low-gain transistor, assumes bias voltages such that it does not conduct. The conduction of transistor 138 causes a current through solenoid coil 136 thereby energizing solenoid 112 to hold blade 97 in its cocked position by the attractive force of the magnet of solenoid 112 on keeper element 104. Since transistor 139 is not conducting under such conditions, solenoid 113 is unenergized and no attractive force is exerted on keeper element 105. Blade 98, thus, will be released from its cocked position under the action of spring 109 which causes blade 98 to rotate in a clockwise direction to an offset position. In such position, opening 127 is no longer in line with lens opening 96 and aperture blade opening 126. Thus, under medium light level conditions the amount of light available to the lens system 21 is controlled by the size of opening 126.

Under bright light conditions over a range of high ambient light levels, where it is desirable to use the smallest aperture opening available, the range of the resistance of photocell 148 is sufficiently reduced in value to a point where the bias voltages on both transistor 138 and transistor 139 cause such transistors simultaneously to conduct. Because of such conduction, both solenoids 112 and 113 are energized and keeper elements 104 and 105 are attracted to the magnets thereof so as to retain aperture blades 97 and 98 in their cocked positions. In such positions, the amount of ambient light made available from the scene to be photographed is controlled by opening 127 of aperture blade 98, the smallest of the three aperture openings.

As discussed above, once a particular exposure aperture opening has been selected, the exposure time must be controlled with such selected opening. One preferred method of providing such control is to vary the "RC" time constant of the integrating circuit, shown and discussed with respect to FIG. 3, accordingly. A preferred method of changing this time constant is to change the value of the capacitance thereof in a discrete manner as a particular discrete aperture blade combination is selected. For this purpose, a pair of micro-switches 93 and 94 (shown schematically in FIG. 3) are mounted to the camera housing in any suitable maner so that their contact elements 130 and 133, respectively, are in electrical contact with contact elements 131 and 134 mounted on the lower surfaces of arms 103 and 102 of blades 98 and 97, respectively.

For example, when aperture blades 97 and 98 are in their cocked positions, and the amount of light is controlled by the smallest aperture opening 127 of blade 98, micro-switches 93 and 94 are both closed. When such switches are closed, capacitances 91 and 92 are each inserted into the circuit of FIG. 3 in parallel with capacitance 89 thereof. Under such conditions a maximum capacitance is utilized and the time constant of the circuit is within its maximum range during exposure when the smallest aperture is utilized.

When the next larger exposure aperture opening 126 is selected to control the amount of available light during exposure, only blade 98 is released to its off-set position and the micro-switch 93 is opened so that only capacitances 92 and 89 are in the circuit of FIG. 3 and the circuit time constant is within its medium range.

Similarly, when the largest aperture opening (aperture opening 116) is used, both blades 97 and 98 are released to their off-set positions and micro-switches 93 and 94 are both opened. Under such conditions, only capacitance 89 is utilized in the circuit of FIG. 3 and the circuit time constant is within its minimum range.

Thus, depending on which exposure aperture openings is selected, an appropriate value of capacitance is inserted into the circuit of FIG. 3 to provide the correct range of time constants during exposure for the particular ambient lighting conditions involved.

Having discussed above an exposure aperture control system for use under ambient lighting conditions, the following paragraphs describe a preferred embodiment of an exposure aperture control system for use under conditions where a flashbulb is to be used. A flashbulb may be used to provide the major source of light, either in the absence of ambient light or under relatively dim ambient lighting conditions, or it may be used as a "fill-in" or supplementary source of light under conditions where ambient lighting provides the primary light source. The system is of the follow-focus type as described in more detail below with reference to FIG. 6 and is used instead of the above described ambient exposure aperture control system when the use of a flashbulb is desired.

Aperture control system—flash

Figure 6:
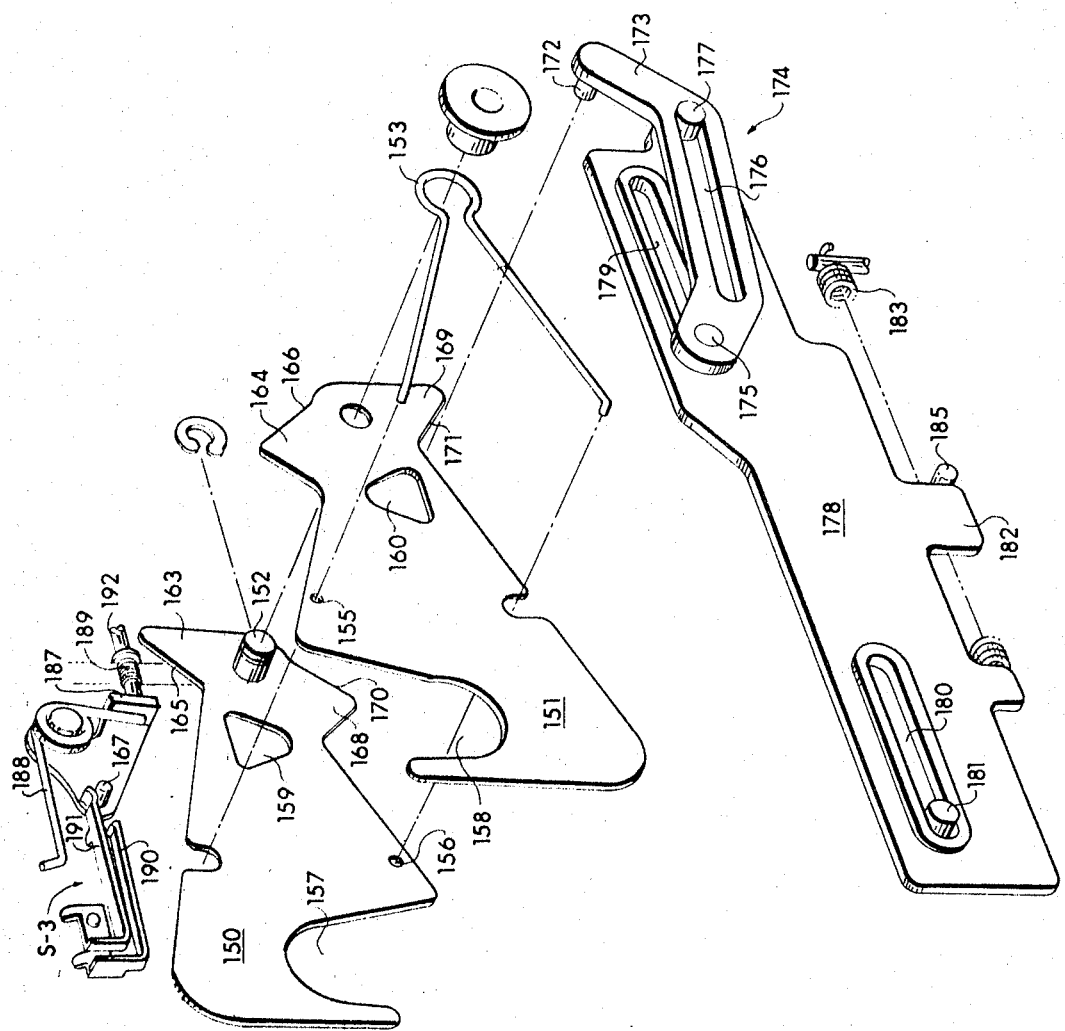
FIG. 6 shows an exploded perspective view of one preferred embodiment of the exposure aperture control system of the invention for use under conditions of artificial light, such as a flashbulb system.

FIG. 6 shows an exploded, perspective, view of a particular embodiment of such a follow-focus, flash system of the invention. In general, the system utilizes a pair of blades which operate in conjunction to form a pair of adjustable openings, one used as an exposure aperture and the other used as a photocell aperture. The blades are mechanically coupled to the lens focusing system so that, as the lens system is moved in accordance with the distance from the subject to the camera, the exposure and photocell aperture openings are varied accordingly. The following paragraphs describe the specific mechanical structure and operation thereof in more detail.

In FIG. 6 a pair of diaphragm blades 150 and 151 are pivotally mounted at a common point by means of a pin 152 which is fixedly attached to a mounting plate (not shown) located within the camera housing. A V-shaped spring 153 having one end inserted into an opening 155 of diaphragm blade 151 and having its other end inserted into an opening 156 of diaphragm blade 150 urges the diaphragm blades in oppositely rotating directions by suitably biasing blade 151 in a clockwise direction and blade 150 in a counterclockwise direction. Blade 150 is provided with an opening 157 and blade 151 is provided with an opening 158, which openings together form an exposure aperture opening in a well-known manner. Blade 150 is similarly provided with an opening 159 and blade 151 an opening 160, which openings together form a photocell aperture opening positioned in front of a photocell (not shown) mounted within the camera housing. The photocell is used in the time control circuit of FIG. 3 as discussed above.

At the right-hand end of diaphragm blades 150 and 151, as shown in the figure, each blade has an upper projecting portion 163 and 164, respectively, having inner surfaces 165 and 166. A stop pin 167 is arranged to be alternatively removed and inserted into the V-shaped opening formed by inner surfaces 165 and 166. As explained in more detail below, the insertion of stop pin 167 locks the diaphragm blades in positions which provide for maximum openings of the exposure aperture opening and the photocell aperture opening and prevents such blades from being rotated out of such position.

The diaphragm blades also have lower projecting portions 168 and 169, respectively, having inner cam surfaces 170 and 171 which form another, substantially V-shaped, opening. A cam-follower pin 172 is movable within such V-shaped opening and urges diaphragm blades to rotate about the pivot point at pin 152 so as to vary the size of the openings of both the exposure aperture and the photocell aperture. Such action can only occur if stop pin 167 is removed from the upper V-shaped opening as discussed above. Cam-follower pin 172 is mounted on one end of an arm 173 of crank 174, which is in turn pivotally mounted at pin 175. Crank 174 has an elongated slot 176 into which is inserted a pin 177 mounted on a slidable element 178. Slidably mounted element 178 has a first elongated slot 179 through which pivot pin 175 of crank 174 is inserted and a second elongated slot 180 through which is inserted a pin 181 fixedly mounted to the mounting panel within the camera housing. Element 178 is, thus, slidably mounted to move horizontally over a path, the extent of which is limited by the length of slot 180.

A tab 182 projects from the lower surface of slidable element 178 and bears against a pin 185 under the action of spring 183 which biases slidable element 178 so as to move it in a direction to the right as shown in the figure. Pin 185 is coupled to the lens focusing mechanism of the camera (not shown) so that, as the lens is moved relative to the film medium, pin 185 moves to the right or to the left depending on whether the subject to be photographed is nearer or farther away, respectively from the camera. As pin 185 moves, tab 182 and, hence, slidable element 178, follows such movement so that opening and closing of the exposure aperture and photocell aperture openings formed by blades 150 and 151 is coordinated with and follows the focusing operation.

Stop pin 167, which is capable of being inserted into the upper V-shaped opening of the diaphragm blades, is mounted on a cam element 187 which because of the biasing action of spring 188 tends to move into the lower, inserted position. In such position it would prevent the movement by cam-follower pin 172 of diaphragm blades 150 and 151. Such a condition is equivalent to the "Flash Out" position of switches 17, 18 and 19 of FIG. 1, and thus would disable the follow-focus system shown in FIG. 6. An opening 189 is provided in the camera housing to allow the insertion of an element 192 of the flashbulb system. Such element, for example, may be a part of one end of a conventional cable mechanism leading from the flashbulb system to the camera housing. Alternatively, such element may be in the form of a mechanical linkage coupled to the flashbulb socket which is caused to operate when the flashbulb is inserted into its socket. In other words, any suitable element, which can be inserted into opening 189 when a flashbulb is inserted into its socket, may be used to cause an upward movement of stop pin 167 to allow operation of the follow-focus system.

When such an element is thus inserted into opening 189 under conditions of flash operation, cam element 187, and, hence, stop pin 167, is urged in an upward direction in opposition to the biasing action of spring 188 so as to move pin 167 vertically to a position above the V-shaped opening of the diaphragm blades, as shown in the drawing. Such movement releases the blades so that their lower cam surfaces 170 and 171 now come in contact with pin 172 and the blades can be positioned appropriately under the action of cam-follower pin 172 which bears upon such lower cam surfaces. Such a condition is equivalent to the "Flash In" operation of switches 17, 18 and 19 of FIG. 1. A switch S–3, shown schematically in FIG. 5, is mounted in a position near cam element 187 and has a first fixed contact 190 and a movable contact 191 which is spring loaded in a manner so as to maintain switch S–3 in a normally closed state. As stop pin 167 moves upward it bears against movable contact 191 and thus causes switch S–3 to open so that no excitation voltage can be applied to the ambient aperture blade control circuit of FIG. 5 and that circuit is thereby disabled for the "Flash In" situation. The overall operation of the above flash follow-focus structure under a "Flash In" condition may be described as follows.

Slidable element 178 is coupled to the lens focusing system of the camera so that tab 182 is moved horizontally in cooperation with the movement of pin 185 as the lens system of the camera is moved to bring the subject into focus in a well-known manner. As the focusing operation is carried out, element 178 is moved concurrently in a horizontal direction against the biasing action of spring 183 via the motion of second elongated slot 180 in conjunction with fixedly mounted pin 181. The motion of element 178 causes a movement of pin 177 in elongated slot 176 such as to cause a pivotal motion of crank 174 about pin 175. Such motion in turn causes a movement of arm 173 of crank 174 so that inner cam surfaces 170 and 171 of diaphragm blades 150 and 151 follow the motion of pin 172. Thus, as tab 182 is moved to the left, for example, as shown in the picture (i.e. under conditions for a close-up shot where the distance from the camera to the subject is short and the anticipated light level is within its maximum range), cam-follower pin 172 is moved in a downward direction so as to cause diaphragm blade 150 to move in a counterclockwise direction and diaphragm blade 151 to move concurrently in a clockwise direction. The concurrent pivotal motions of the diaphragm blades, thus, reduce the sizes of both the exposure aperture and the photocell aperture openings to their minimum ranges.

Similarly, as tab 182 is moved to the right (under conditions where the subject is further away from the camera and the anticipated light level is within its minimum range) the diaphragm blades rotate in the opposite directions so as to cause the exposure aperture and the photocell aperture openings each to become larger. Such a condition is actually shown in the drawing.

Under conditions where a flashbulb system is to be used, the total amount of light energy available from the flashbulb is, of course, limited in accordance with the flashbulb light output characteristics. Thus, once flashbulb operation is initiated, a fixed amount of light is available for a fixed amount of time. In theory, the flash follow-focus system described above could be arranged to provide an exposure aperture-exposure time combination such that the total energy available from the flashbulb is substantially always used (i.e. a specific aperture size can be selected so that the exposure time is set to equal the fixed time over which the flashbulb light energy is available). In practice, however, such a condition is only useful when the anticipated light energy from the flashbulb is substantially equal to (or greater than) the actual light energy available during exposure, an equality that may not always exist under realistic conditions.

Thus, in a case where the actual light level during exposure is less than the anticipated light level, no further energy is available from the flashbulb to make up for such a decrease in the expected light level no matter how much longer the exposure time is increased. Thus, in practice, something less than an optimum exposure is obtained in such a case. It should be noted that no difficulty arises when the actual light level during exposure is greater than that anticipated since in that case the exposure time control circuit will merely close the shutter at an earlier time than anticipated and an optimum aperture-time combination will still be obtained.

In order to overcome the difficulty which may arise when the actual light level is less than anticipated, the exposure aperture in the follow-focus system preferably may be arranged to provide an opening which is approximately ¼ to ¾ of a stop larger than that theoretically needed to use all of the available flash energy during exposure. Under such an arrangement if the actual light level during exposure is substantially equal to the anticipated light level, the exposure time control circuit merely allows the shuter to remain open for a time less than the total time over which light is available from the flashbulb. Under such conditions, although more light energy will be available from the flashbulb than is actually needed and a portion of that energy will not be used, the aperture-time combination will still be optimally selected. However, under such an arrangement, if the actual light level during exposure is less than that which is anticipated, the exposure time control system now has the capability of increasing the exposure time so as to use some or all of that unused portion of the light energy as necessary.

Thus, a follow-focus system wherein the exposure aperture is ¼ to ¾ of a stop larger than theoretically necessary allows for a reasonable margin of error between the anticipated light level and the actual light level and thereby always maintains optimum operating characteristics.

As described above with reference to the ambient control system, it is necessary also that the exposure time control system under flash conditions be controlled in accordance, not only with the actual light level of the scene being photographed during exposure, but also in accordance with the particular exposure aperture that has been selected by the aperture selection system. In the ambient case, it will be recalled, the latter control was obtained by varying the time constant of the time control integrating circuit in a discrete manner in accordance with the discrete aperture blade selection. In the flash follow-focus system, such control is obtained mechanically by utilizing diaphragm blades 150 and 151 which provide for two aperture openings (exposure aperture and photocell aperture) arranged in such a manner that the size of the photocell aperture opening automatically changes simultaneously with a change in the size of the exposure aperture opening. Such control is represented in the bloc diagram of FIG. 1 by the block 5 (designated as "Photocell Aperture Control") which in the "Flash In" situation provides a control path from follow-focus control system 11 to photocell 16 of the exposure time control system.

Although the above description and drawings depict one preferred embodiment of the invention, those skilled in the art will be able to recognize other embodiments that may differ in some elements from the particular structures discussed here. Thus, variations in many of the specific structural elements used will occur to those skilled in the art without departing from the scope of this invention. Hence, the invention is not to be construed as limited to the embodiment specifically shown and described herein, except as defined by the appended claims.

What is claimed is:

1. In a photographic apparatus, an exposure control system comprising:

exposure aperture means including a plurality of discretely selectable blades each having a single opening said openings being of different sizes for passing light from a scene to be photographed therethrough;

shutter means for covering and uncovering an opening of said exposure aperture means;

circuit means including a photocell responsive to the anticipated ambient light level of said scene for automatically selecting a combination of said blades to be used with said shutter means to provide a particular exposure aperture opening size prior to the initiation of an exposure in said apparatus;

means including an integrating circuit having an adjustable time constant, said means being responsive to the selection of said aperture opening size and to the ambient light level of said scene during exposure for subsequently controlling the time during which said shutter uncovers said aperture opening;

said integrating circuit comprising a photocell having a resistance value dependent on said ambient light level and a plurality of selectable capacitances;

switching means for automatically selecting at least one of said capacitances in response to the selection of said exposure aperture opening whereby the time constant of said integrating circuit is determined by the resistance of said photocell and the value of said selected capacitances; and means for actuating the movement of said shutter to initiate exposure in said photographic apparatus.

2. In a photographic apparatus, an exposure control system comprising:

exposure aperture means including a plurality of discretely selectable blades each having a single opening, said openings being of different sizes for passing light from a scene to be photographed therethrough;

shutter means for covering and uncovering a selected exposure aperture opening;

means for moving said blades into an initial position prior to exposure so that said openings are initially aligned with a lens system of said apparatus;

means for retaining a selected combination of said blades in said initial position during exposure;

said retaining means comprising a circuit including photocell means having a resistance value dependent on the light level impinging thereon from a scene to be photographed, a plurality of electromagnetic means, and a switching means responsive to the resistance value of said photocell means prior to the initiation of an exposure for selectively energizing said electromagnetic means whereby a selected combination of said blades are retained in said initial position in response to said energization to be used with said shutter means to provide a selected exposure aperture opening;

means including an electronic integrating circuit having an adjustable time constant for subsequently controlling the time during which said shutter means uncovers said selected exposure aperture opening;

means for adjusting the time constant of said integrating circuit in response to the selection of said combination of blades;

photocell means in said integrating circuit having a resistance value dependent upon the light level of said scene to be photographed during exposure whereby said time constant is further adjusted in response to changes in said resistance value; and means for acuating the movement of said shutter means to initiate said exposure in said photographic apparatus.

3. An exposure control system in accordance with claim 2 in which said exposure aperture means includes a pair of blades and said circuit means includes a pair of electromagnetic means which are selectively energized to retain a selected combination of said blades in their initial positions in response to said energization.

4. In a photographic apparatus having a lens system for use with auxiliary flashbulb lighting apparatus, an exposure control system comprising:

means for focusing said lens system of said photographic apparatus;

exposure aperture means having an adjustable opening therein for passing light from a scene to be photographed therethrough;

means coupling said focusing means and said exposure aperture means for automatically selecting the size of the opening of said exposure aperture means in response to the amount of light anticipated from said scene due to said auxiliary flashbulb lighting apparatus;

shutter means movable to cover and uncover the opening of said exposure aperture means;

means responsive to said automatic aperture selection means and to the light level of said scene during exposure for controlling the time during which said shutter means is actuated to cover and uncover said opening; and means for actuating said shutter means to initiate exposure in said photographic apparatus.

5. In a photographic apparatus having a lens system for use with auxiliary flashbulb lighting apparatus mounted on said photographic apparatus, an exposure control system comprising:

means for focusing said lens system in accordance with the distance from a subject to be photographed to said photographic apparatus;

exposure aperture means having a continuously adjustable opening therein for passing light from a scene to be photographed therethrough;

mechanical means coupling said focusing means and said exposure aperture means for automatically adjusting the size of said adjustable opening to select an opening of said exposure aperture means in response to the focusing of said lens system;

shutter means movable to cover and uncover the opening of said exposure aperture means;

exposure time control means responsive to the selection of said exposure aperture opening and to the light level of said scene during exposure for controlling the time during which said shutter means is actuated to cover and uncover said opening; and means for actuating said shutter means to initiate exposure in said photographic apparatus.

6. An exposure control system in accordance with claim 5 in which said exposure time control means includes an electronic integrating circuit having an adjustable time constant, said circuit being responsive to the automatic adjustment of the size of said exposure aperture opening and to the light level of said scene during exposure for controlling the time during which said shutter means is actuated to cover and uncover said opening.

7. In a photographic apparatus having a lens system for use with auxiliary flashbulb lighting apparatus mounted on said photographic apparatus, an exposure control system comprising:

means for focusing said lens system in accordance with the distance from a scene to be photographed to said photographic apparatus;

exposure aperture means having a continuously adjustable opening therein for passing light from a scene to be photographed therethrough;

mechanical means coupling said focusing means and said exposure aperture means for automatically adjusting the size of said adjustable opening to select said size in response to the focusing of said lens system whereby said opening is automatically adjusted in response to the amount of light anticipated from said scene due to said auxiliary flashbulb lighting apparatus;

shutter means movable to cover and uncover the opening of said exposure aperture means;

exposure time control means including an electronic integrating circuit having a photocell means responsive to the light level of said scene during exposure and photocell aperture means having an opening for permitting light from said scene to impinge on said photocell during exposure;

mechanical coupling means for adjusting the opening of said photocell aperture means in response to the automatic adjustment of the size of said opening of said exposure aperture means whereby said exposure time control means controls the time during which said shutter means is actuated to cover and uncover said opening; and means for actuating said shutter means to initiate exposure in said photographic apparatus.

8. In a photographic apparatus having a lens system for use with auxiliary flashbulb lighting apparatus, an exposure control system comprising:

exposure aperture means having an adjustable opening therein for passing light from a scene to be photographed therethrough;

means coupling said focusing means and said exposure aperture means for automatically selecting the opening of said exposure aperture means in response to the amount of light anticipated from said scene due to said auxiliary flashbulb lighting apparatus, said means being adapted to select an opening which is larger than that required for a correct exposure with an exposure time equal to the time during which the anticipated light from said flashbulb apparatus is to be available;

shutter means movable to cover and uncover the opening of said exposure aperture means;

means responsive to said automatic aperture selection means and to the actual light level of said scene during exposure for controlling the time during which said shutter means is actuated to cover and uncover said opening; and means for actuating said shutter means to initiate exposure in said photographic apparatus.

9. An exposure control system in accordance with claim 8 wherein said automatic selecting means is adapted to select an opening which is up to ¾ of a stop larger than that required for a correct exposure with an exposure time equal to the time during which the anticipated light from said flashbulb apparatus is to be available.

10. In a photographic apparatus having a lens system for use with auxiliary flashbulb lighting apparatus, an exposure control system comprising:

means for focusing said lens system in accordance with the distance from a scene to be photographed;

aperture means having a pair of rotatable blades mounted adjacent each other and forming a pair of adjustable openings for passing light from a scene to be photographed therethrough;

mechanical means coupling said focusing means and said aperture means for automatically selecting the size of each of said pair of openings of said aperture means in response to the amount of light anticipated from said scene due to said auxiliary flashbulb lighting apparatus, the first of said openings forming an exposure aperture and the second of said openings forming a photocell aperture;

shutter means movable to cover and uncover said selected exposure aperture opening;

exposure time control means including an electronic integrating circuit having a photocell means, the resistance value of which is dependent on the light level of said scene during exposure, the size of said photocell aperture opening controlling the amount of light impinging on said photocell means during exposure whereby the time during which said shutter means is actuated to cover and uncover said opening is controlled by said electronic integrating circuit means; and means for actuating said shutter means to initiate exposure in said photographic apparatus.

11. In a photographic apparatus an exposure control system comprising:

first exposure aperture means having an adjustable opening capable of passing light from a scene to be photographed;

first control means for automatically selecting the size of said first adjustable opening in response to the anticipated ambient light level of said scene;

second exposure aperture means having an adjustable opening capable of passing light from a scene to be photographed;

second control means for automatically selecting the size of said second adjustable opening in response to the anticipated light level from said scene due to an auxiliary flashbulb lighting apparatus;

shutter means capable of covering and uncovering the openings of said first and said second exposure aperture means;

time control means for controlling the time over which said shutter means uncovers said aperture openings;

means for selecting one of said first or said second exposure aperture means for use with said time control means whereby an exposure aperture and exposure time combination is automatically provided in accordance with the anticipated lighting conditions of said scene to be photographed.

12. In a photographic apparatus an exposure control system comprising:

first exposure aperture means having a discretely adjustable opening capable of passing light from a scene to be photographed;

first control means for automatically selecting the size of first discretely adjustable opening in response to the anticipated ambient light level of said scene;

second exposure aperture means having a continuously adjustable opening capable of passing light from a scene to be photographed;

second control means for automatically selecting the size of said second continuously adjustable opening in response to the anticipated light level from said scene due to an auxiliary flashbulb lighting apparatus;

shutter means capable of covering and uncovering the openings of said first and said second exposure aperture means;

time control means for controlling the time over which said shutter means uncovers said aperture opening; and means for selecting one of said first or said second exposure aperture means for use with said time control means whereby an exposure aperture and exposure time combination is automatically provided in accordance with the anticipated lighting conditions of said scene to be photographed, said selecting means comprising:

switching means actuated when said flashbulb lighting apparatus is operative for disabling said first control means; and mechanical locking means for preventing the operation of said second control means when said flashbulb lighting apparatus is not operative.

References Cited

UNITED STATES PATENTS

| | | |
|---|---|---|
| 2,978,970 | 4/1961 | Fahlenberg. |
| 3,257,919 | 6/1966 | Sato et al. |
| 3,273,483 | 9/1966 | Weidner et al. |

NORTON ANSHER, Primary Examiner

J. F. PETERS, Jr., Assistant Examiner

U.S. Cl. X.R.

95—64